J. A. WALSH.
GRAIN SAVING DEVICE FOR THRESHING MACHINES.
APPLICATION FILED JAN. 8, 1915.

1,181,360.  Patented May 2, 1916.

Witnesses:

Inventor.
James A. Walsh, ated # UNITED STATES PATENT OFFICE.

JAMES A. WALSH, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

GRAIN-SAVING DEVICE FOR THRESHING-MACHINES.

1,181,360. Specification of Letters Patent. Patented May 2, 1916.

Application filed January 8, 1915. Serial No. 1,065.

*To all whom it may concern:*

Be it known that I, JAMES A. WALSH, a citizen of the United States, residing at Indianapolis, in the county of Marion and State of Indiana, have invented certain new and useful Improvements in Grain-Saving Devices for Threshing-Machines, of which the following is a specification.

My invention relates to improvements in what is known as the Sharpe grain saving device for threshing machines, the object being to provide improved means for efficiently conveying the saved grain and material mingled therewith to the threshing machine to be recleaned, which material is composed of chaff, dust, short straws, grain and unthreshed heads of grain, and, being normally light and fluffy, and to a certain extent interwoven, must be conveyed from the grain trap with the least possible resistance. Therefore, I provide a conveyer comprising two communicating auger sections, one adapted to deliver the material to the other, but each mounted independently of the other, and each held in position by a single bearing and so arranged that they may be driven at the same rate of speed or the speed of each of which may be varied to suit conditions, and so mounted that there will be no obstructions to retard the movement of the material, which must have free and uninterrupted passage through the auger sections to be positively conveyed thereby.

Figure 1:
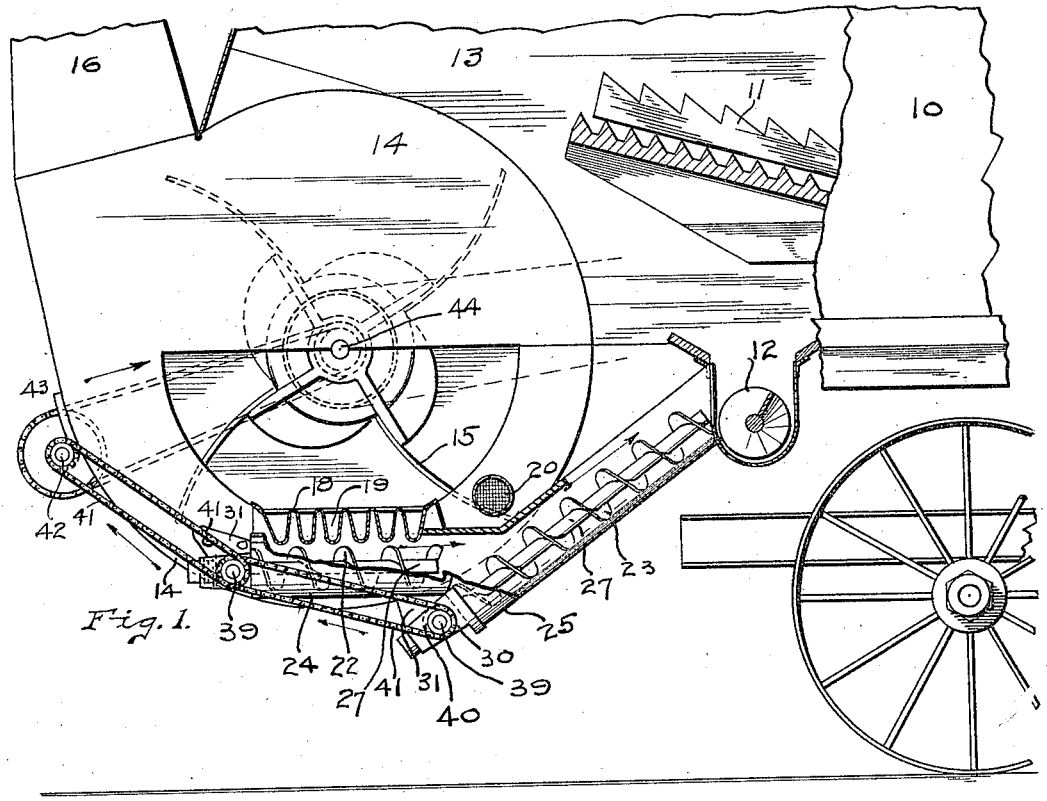
Figure 2:
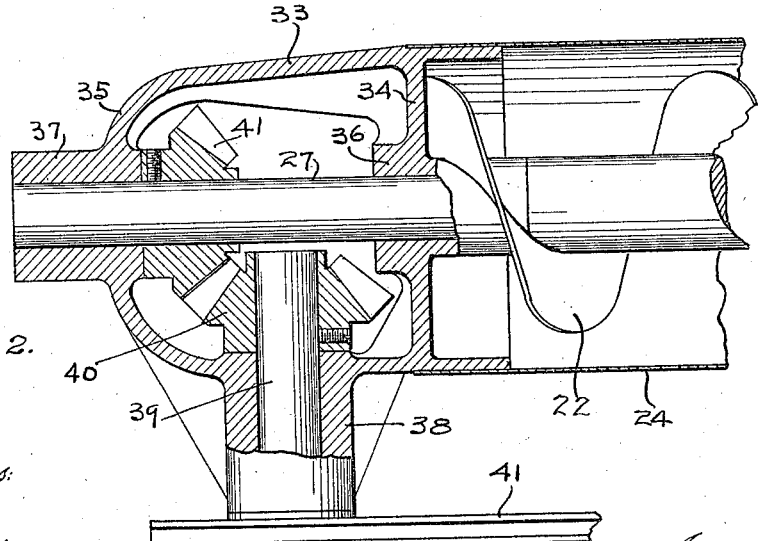

In the accompanying drawing, forming a part hereof, Figure 1 is a longitudinal sectional view of a portion of a threshing machine, with a wind stacker attached embodying a grain trap, and my improved conveyer associated therewith, and Fig. 2 is a detail sectional view of the bearings which I employ for supporting the auger sections.

In said drawings the portion marked 10 indicates a threshing machine including the usual straw carrier, 11, and tailings auger, 12. The wind stacker attached to said machine may be of any approved type and includes the usual straw chamber, 13, fan casing, 14, fan, 15, and chute, 16; the hopper leading to the fan being omitted to more clearly show the grain trap and conveyer.

The grain trap, 18, may be of the form indicated in Fig. 1, or any approved form for the purpose, over which straw is conveyed 19, of which grain is separated and trapped into the stacker fan, and between the guides, from the straw and discharged into the conveyer beneath. A blast pipe (not shown) is attached to the fan casing at 20 and is so arranged as to distribute the air blast across the grain trap 18 for accelerating the movement of the material into the grain trap in a usual and well known manner. Beneath said trap 18 I provide a conveyer section comprising an auger, 22, which leads to an inclined auger, 23, each of which is incased in a suitable boxing 24, 25, said conveyer sections being so arranged in relation to each other that auger 22 will convey material falling through the grain trap into auger 23 which in turn conveys it to tailings auger 12. In practice it has been demonstrated to be impracticable to provide bearings for the auger sections in the boxings 24, 25, for the reason that the material being conveyed is of a character which will quickly become entwined and matted about any obstruction in its path, and particularly so when in damp condition, with the result that the conveyer becomes clogged and inoperative. Therefore, I provide a bearing for said augers by which the shafts 27 thereof will be securely held in position exteriorly of the boxings 24, 25, and thus obviate the necessity of placing bearings therein, which as indicated, would tend to retard and obstruct the material being conveyed. The bearings for each of the augers are substantial duplicates, except that the bearing, 30, for auger shaft 27 is preferably provided with a plate, 31, for affixing said bearing to fan drum 14 as desired. It will be understood, of course, that there are many types of threshing and similar machines of varying heights, widths and capacities, and that the tailings augers thereof, as 12, are located somewhat differently in the many types so that the degrees of inclination from auger 22 to such tailings augers are greater or less in different machines. By employing the plate 31 or similar device I am enabled to adjust conveyer section 23 to any desired angle and thus secure the same to fan housing 14. Said bearing comprises a boxing, 33, having front and rear walls 34, 35, respectively, and said walls having enlarged portions 36, 37, through which the auger shaft 27 extends, to form substantial bearings for said shaft, and, being an appreciable distance apart, form a double bearing which will insure that said shaft will be firmly held therein and rotate its auger without wabbling. At one side of the structure I provide a bearing, 38, for a drive shaft, 39, which actuates shaft 27 through the intermeshing gears 40, 41, carried by said shafts respectively, shaft 39 being driven by a suitable sprocket and chain 40, 41, from any suitable source of power such as the shaft 42 which communicates through a suitable sprocket or pulley, 43, connected to a similar device on stacker fan shaft, 44, as will be readily understood.

While I have shown two chains for driving the auger sections it will be understood that a single chain may be employed; but by employing two I am enabled to readily arrange such driving mechanism to drive both augers at the same speed or vary the speed of one in relation to the other as conditions demand. As will be readily understood, auger 22 occupies a space coincident with that of grain trap 18 and quickly propels material discharged therefrom to the inclined auger 23 because of the slight distance which the material must travel, and auger 23 as readily picks up the oncoming material and carries it to the tailings auger, all as before pointed out, without obstructing the passage thereof by interior bearings or otherwise, and in actual practice I have found the use of the double augers in the manner stated to be highly efficient and satisfactory for the purpose. In some instances, it may be stated, the threshing machine is so designed that the tailings auger or similar return device is positioned much closer to the ground, obviating the necessity of employing the two augers, in which case the single auger may be used in connection with the bearing shown as described, which will occupy a position substantially as shown in Fig. 1 with reference to the auger 22. It is of extreme importance that neither the conveyer nor its bearing shall project appreciably below the periphery of the fan drum 14, to avoid danger of breakage when pulling the machinery over ruts, and by forming a compact bearing in the manner shown the same occupies but a minimum of space on the fan drum and insures against the breakage stated, while the similar bearing on the forward auger will be clear of the ground to a greater or less extent, according to the required inclination of such auger.

I claim as my invention:

1. In a grain saving device for threshing machines, the combination, with a fan drum, of a material receiving and conveying receptacle, a grain trap interposed between said drum and receptacle, a boxing beneath said trap, a bearing communicating with one end of said boxing, a spiral conveyer in said boxing and mounted in said bearing for conveying material from said trap, a boxing communicating with said conveyer, a bearing communicating therewith, a spiral conveyer mounted in said bearing and inclosed in said last named boxing for receiving and conveying material from said first mentioned conveyer, and means communicating with said conveyers for driving the same.

2. In a grain saving device for threshing machines, the combination, with a fan drum, of a material receiving and conveying receptacle, a grain trap interposed between said drum and receptacle, a spiral conveyer beneath said trap for conveying material therefrom which has been delivered thereinto from said receptacle, a boxing communicating with said conveyer and having multiple bearings in alinement for supporting the same, a gear-wheel mounted on said conveyer, a laterally disposed bearing forming part of said boxing, a drive shaft mounted in said bearing, a gear-wheel mounted thereon and meshing with said gear-wheel on said conveyer, and means for actuating said drive shaft to rotate said conveyer.

3. In a grain saving device for threshing machines, a grain trap, a horizontally arranged spiral conveyer positioned therebeneath for conveying material therefrom, an inclined spiral conveyer associated with said horizontal conveyer for receiving and conveying material from the latter, an independent bearing for each of said conveyers, and means communicating with said conveyers for actuating same.

4. In a grain saving device for threshing machines, a grain trap, two connecting spiral conveyers associated therewith for receiving and conveying material therefrom, a boxing for each of said conveyers embodying a multiplicity of bearing members for the shaft of said conveyers, and means for actuating one of such conveyers to impart motion to the others.

5. In a grain saving device, a grain trap, a horizontal conveyer associated therewith for receiving and conveying material therefrom, an inclined conveyer for receiving and conveying material therefrom communicating with said horizontal conveyer and provided with means whereby it may be affixed at different degrees of inclination in relation to said horizontal conveyer, and means for simultaneously actuating said conveyers.

6. In a grain saving device for threshing machines, the combination, with a fan drum, of a material receiving and conveying receptacle, a grain trap interposed between said drum and receptacle for receiving material which has been delivered thereinto from the latter, a spiral conveyer beneath said trap, a second spiral conveyer communicating with said conveyer, and means for actuating said conveyers to convey material discharged from said trap.

In testimony whereof I affix my signature in presence of two witnesses.

JAMES A. WALSH.

Witnesses:
C. D. MORRISON,
LEE R. GARBER.

Copies of this patent may be obtained for five cents each, by addressing the "Commissioner of Patents, Washington, D. C."